UNITED STATES PATENT OFFICE.

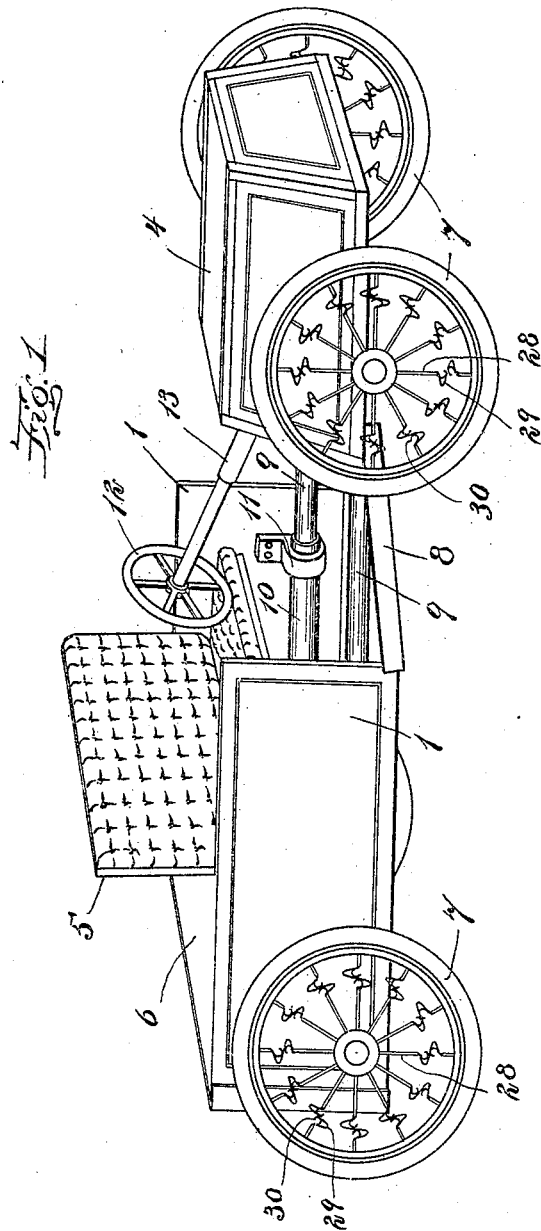

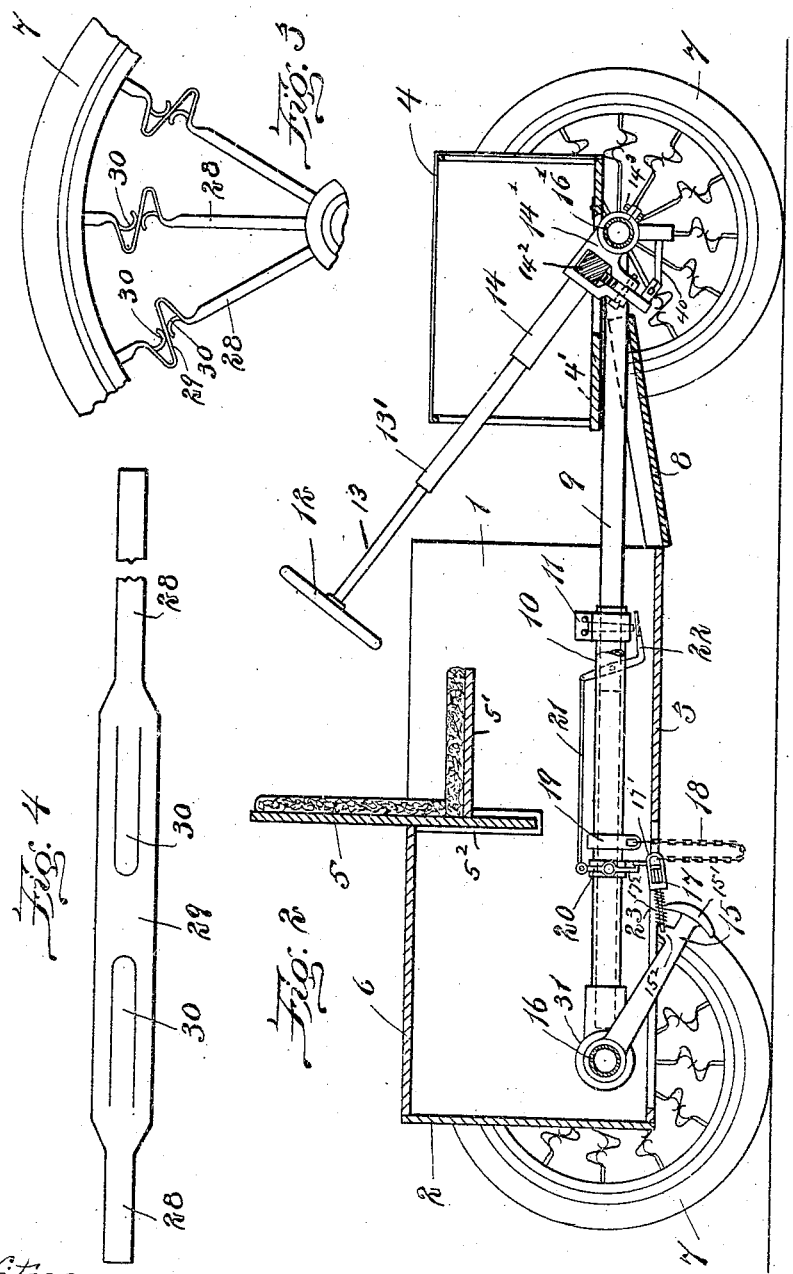

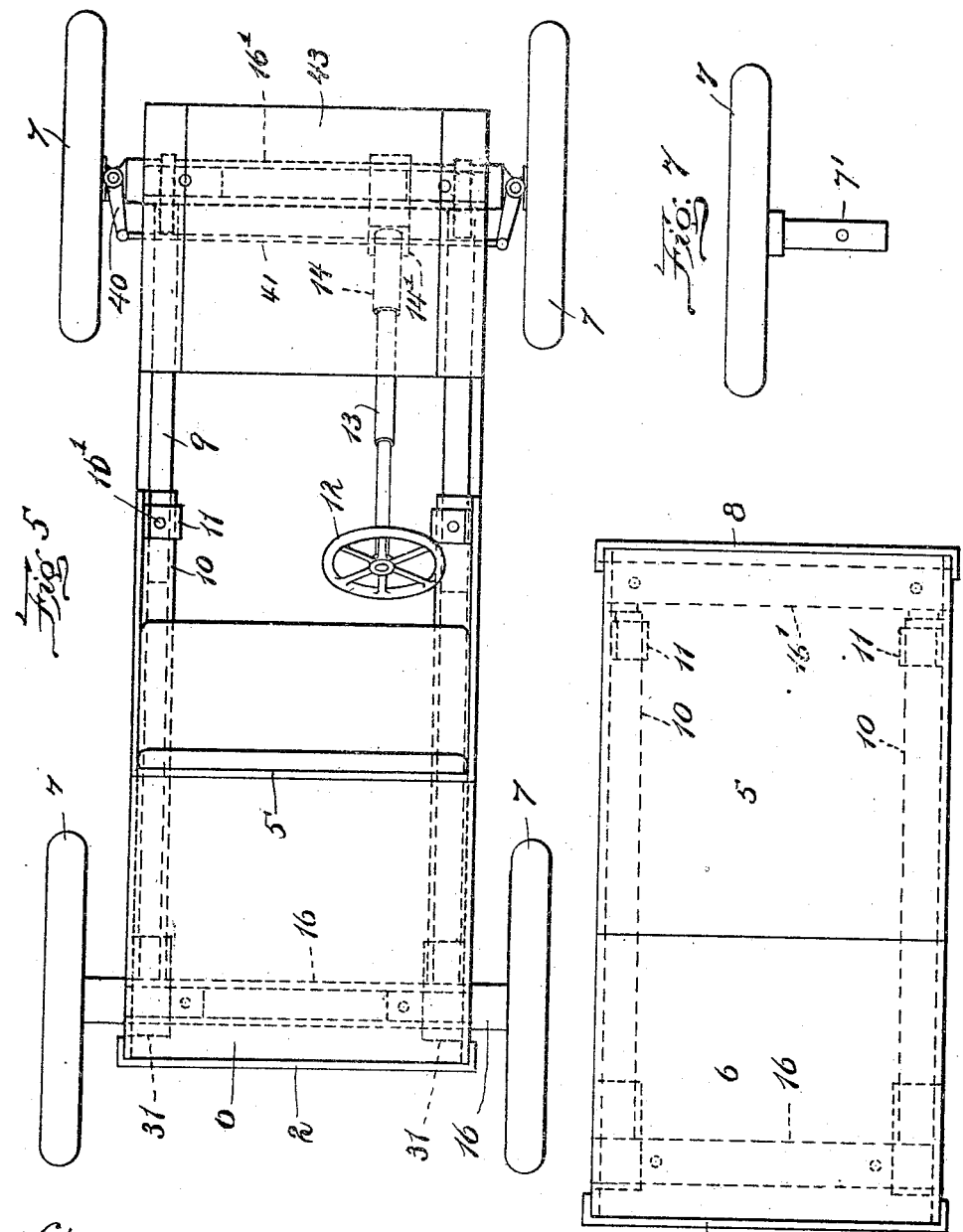

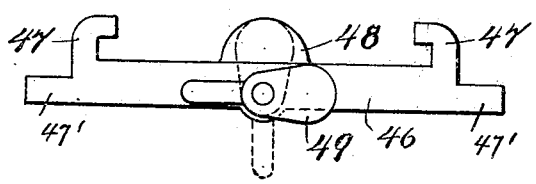
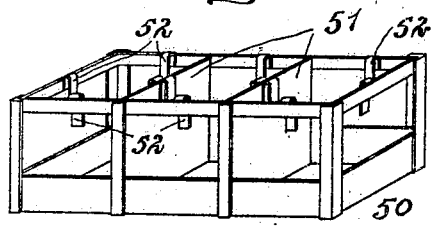
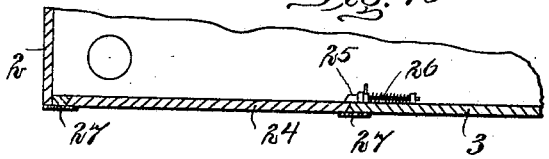
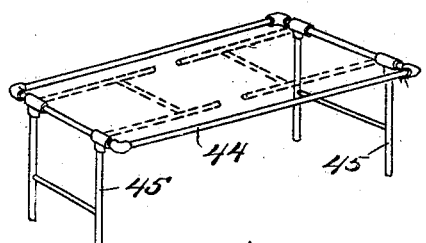
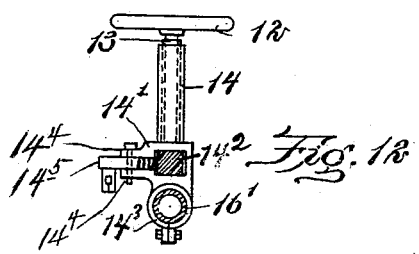
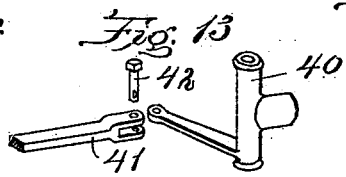
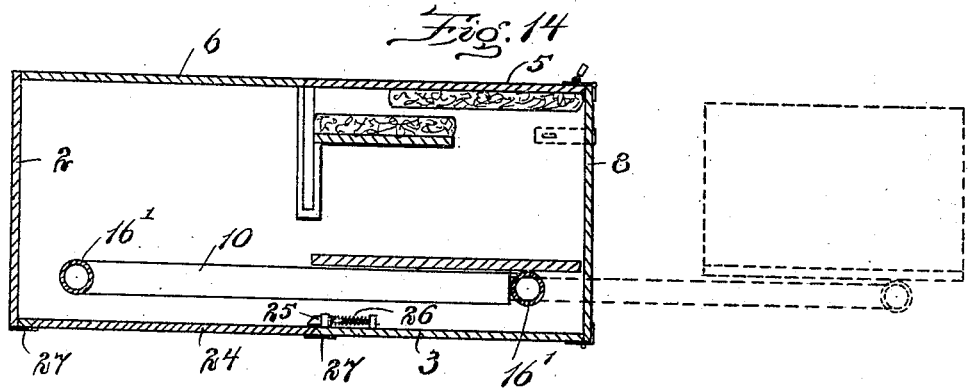

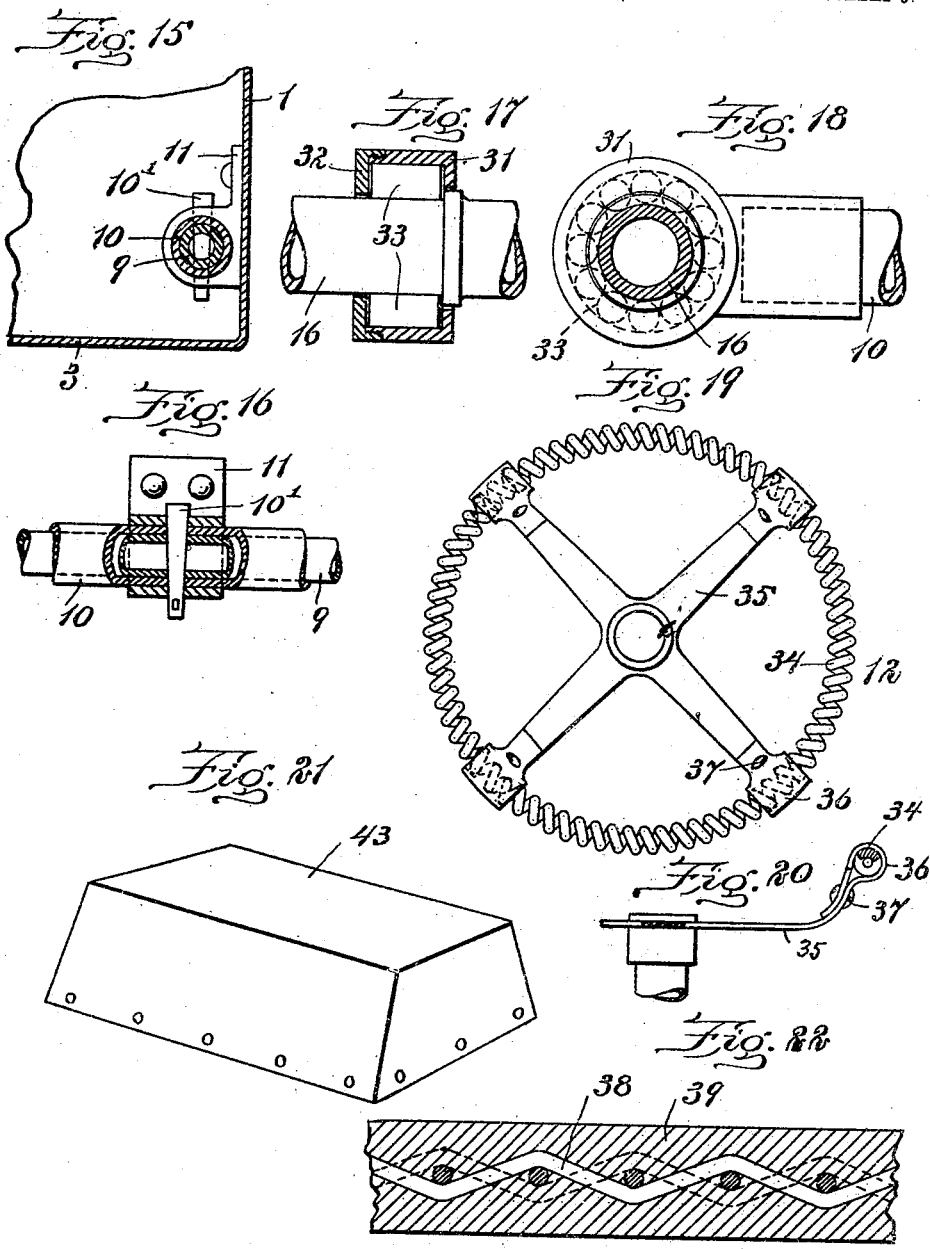

EDWIN C. BRUEN, OF BROOKLYN, NEW YORK.

VEHICLE.

No. 873,711.      Specification of Letters Patent.      Patented Dec. 17, 1907.

Application filed October 11, 1906. Serial No. 338,355.

*To all whom it may concern:*

Be it known that I, EDWIN C. BRUEN, a citizen of the United States, and resident of Brooklyn, in the county of Kings and State of New York, have invented certain new and useful Improvements in Vehicles, of which the following is a specification.

My invention relates to improvements in vehicles and detachable wheels therefor, and is particularly designed for vehicles of the class known in the trade as automobile runabouts.

One object of my invention is to produce an automobile body or chassis which can be entirely closed to form a closed case of rectangular or other desirable shape and constitute a trunk or inclosing case for all parts of the automobile whereby the same can be locked and conveniently stored or shipped for transportation.

A further object is to provide practical means whereby when said truck or inclosing case is unlocked the body can be distended, various parts of the same be manipulated to form the seat, back and front of the body or chassis, and the detachable wheels secured in place to complete the vehicle and render it ready for immediate use as an automobile runabout.

With these objects in view my invention consists in the novel parts, and combination of novel parts hereinafter described and pointed out in the claims, concluding this specification.

Figure 1, is a perspective view of a folding automobile embodying my invention. Fig. 2, is a vertical central section thereof. Fig. 3, is a fragmentary side elevation of the wheel I prefer to employ showing a novel construction of spokes, and Fig. 4 a plan view of the spoke blank. Fig. 5, is a top plan showing the chassis distended and open, and Fig. 6, a similar view showing the chassis closed. Fig. 7, is a detail of one of the rear wheels and axle therefor. Fig. 8, is a front view in elevation of the cradle or holder for the engine or motor employed. Fig. 9, is a detail of the holder for the gasolene tanks. Fig. 10, is a detail showing the removable portion of the vehicle body. Fig. 11, is a perspective view of the skeleton frame of the front end of chassis, the dotted lines indicating how the legs or vertical supporting rods fold upwardly under the top of the skeleton frame. Fig. 12, is a detail showing the sections of the steering rod telescoped together. Fig. 13, is a detail view of the steering knuckles, connecting arm, wheel hub, cotter pin and steering rod, the several parts being shown detached. Fig. 14, is a vertical section of the frame or chassis closed and locked, the forward extension thereof being shown by dotted lines. Fig. 15, is a vertical section and Fig. 16, a cross-section of the supporting bracket for the extensible inner frame and adjustable locking means therefor. Figs. 17, and 18, are detail views of roller bearings for the rear axles. Fig. 19, is a top plan view of the spring steering head, and Fig. 20, a detail of the same. Fig. 21, is a perspective view of the extensible forward end of the chassis. Fig. 22, is a cross-section of a fragment of the body showing means for strengthening the same by interposing or inserting therein a wire fabric.

Like numerals of reference designate corresponding parts in the several figures of the drawings.

The body or chassis of a vehicle embodying my improvements may be made of papier mâché, artificial leather, wood veneering or other suitable material, and may be strengthened if desirable with tubular wire as hereinafter described. This body or chassis consists of the sides 1, rear end 2, bottom 3, front end 4, folding seat 5, top 6, and hinged front board 8. In the lower part of the body or chassis I mount in brackets 11, on the interior of each side 1, a tube 10, preferably made of seamless steel tubing, and each tube 10 is engaged by a smaller tube 9 of similar material which can be slid into its tube 10, when the body or chassis is closed, or extended forwardly therefrom when the latter is opened to form the vehicle, or in other words these tubes telescope together, and in this position are firmly secured by removable cotter pins $10^1$ (see Figs. 15 and 16).

The forward end of each tube 9, will be brazed to a boss extending from a sleeve (not shown) suitably mounted on the forward axle $16^1$, and the inner end of each tube 10, will be similarly brazed to a boss $31^1$ extending from a sleeve 31, mounted on the rear axle 16.

The front wheels 7, are removably journaled to a single axle $16^1$ while each rear wheel 7, is mounted upon a short axle $7^1$, (see Fig. 7) the rear wheels being attached to the wagon body by inserting each axle $7^1$, transversely through a sleeve 31, and securing the axles in place by means of removable cotter pins (see dotted lines Fig. 5). The forward end 4 of the body or chassis consists of the platform $4^1$, which may be mounted in any suitable manner upon the bosses extending from the sleeves mounted on the front axle $16^1$. Upon this platform I mount a skeleton frame consisting of the rectangular frame 44, having hinged at each end thereof a pair of legs 45, (see Fig. 11). When this frame is set in place on the platform 4, each leg 45, enters a vertical socket in the platform 4, at the respective four corners thereof; this frame when the chassis is extended will be covered with a hood 43 (see Fig. 21) which may be made of canvas or other suitable material, and be attached to the platform 41 by buttons or clasps of any desirable construction. The steering head 12, is attached to the outer end of a sectional telescopic rod 13, $13^1$, 14, the lower end of which is secured in the block $14^1$, the latter being removably mounted on the axle $16^1$. The distended position of the steering head and telescopic steering rod is shown in Fig. 2, and its closed position is shown in the detail view Fig. 12. As shown the steering rod extending from the steering head 12, consists of three tubular sections 13, $13^1$ and 14, preferably made of seamless steel tubing, the section 13, being adapted to telescope into the section $13^1$ and the section $13^1$ telescoping into the section 14, as shown in Fig. 12. The lower end of the section 14, is provided with a worm gear $14^2$, journaled in the block $14^1$; this block terminates in a split-ring $14^3$ adapted to engage the wheel hub and is adjustably locked in place on the hub by means of a bolt and nut, or in other appropriate manner.

The block $14^1$ is provided with extensions $14^4$, in which a segment $14^5$ is pivoted, and this segment engages the work gear $14^2$ (see Figs. 2 and 12); the segment $14^5$ is connected by means of the arm 41 to the steering knuckles 40 which are respectively mounted in the usual manner on the wheel hubs. While I have shown the steering rod composed of three tubular sections preferably composed of seamless steel tubing, it is obvious that any desired number of sections may be employed, and that any material suitable for the purpose may be used. The rear end of the bottom 3, of the chassis is provided with a removable section 24, having beveled edges and supported on metal brace strips 27, which extend across the bottom 3, and may be nailed or otherwise secured to the fixed sections of the bottom 3, the strips 27 being made wide enough to form a seat for the removable section 24, when the latter is in place to close the bottom 3, as shown in Fig. 10; in this position the section 24, is locked in place by means of the spring locking catch 25, 26. The object of providing this removable section for the bottom of the body or chassis, is to provide an opening through which the brake and its connections may extend when the body or chassis is open as shown in Fig. 2, and the braking mechanism is maintained in position for operating, and be utilized when necessary.

For the purposes of a light vehicle of the construction described and shown in the drawings I prefer to employ a brake for use only as an emergency stop because under ordinary conditions the vehicle will be under easy control of the operator. The braking mechanism I prefer to employ comprises the brake rod 15, mounted at its upper end on the axle 16, and having at its lower end the curved shoe $15^1$, the brake rod 15, is provided with an extension $15^2$, to which one end of a spring 23, is connected, the other end of this spring being secured to a clevis 17, having an upwardly extending staple $17^1$, which is normally in engagement with a hook $17^2$, pivoted in a bracket 20, mounted on the tube 10, as particularly shown in Fig. 2; the upper end of the pivoted hook $17^2$, is fixed to a rod 21, which extends forwardly and terminates in a crank-shaped foot treadle 22. If an emergency arises where it is necessary to use this brake, the operator can by the pressure of his foot on the treadle 22, move the rod 21 forwardly thereby disengaging the hook $17^2$ from the staple $17^1$ whereupon the brake rod 15 will fall downwardly and the shoe $15^1$ come into contact with the ground and act as a lever to raise the rear wheels from the ground and quickly stop the momentum of the vehicle; under such circumstances the spring 23, comes into play and has the tendency by reason of its resiliency to prevent any undue shock when the braking mechanism is operated; the chain 18, one end of which is attached to the clevis 17, and the other end to the bracket 19, prevents the rod 15 from passing rearwardly beyond an approximately perpendicular plane with relation to the horizontal axis of the axle 16. At the forward end of the bottom 3, and when the chassis is open and extended as shown in Fig. 2, the forward end of the front board 8, will be secured to the bottom of the platform $4^1$, by means of a hook or in any other convenient manner so that it can be readily detached from the platform $4^1$ when the chassis is closed to form a rectangular case as shown in Figs. 6 and 14; under such conditions the front board 8, will form the front end of the case and be provided with a lock $8^1$ of any suitable construction, by means of which the case containing all the various parts of the automobile can be locked and be ready for convenient transportation and handling. The folding seat I propose to employ is composed of the movable member 5, and the stationary member $5^1$; the movable member 5, when the body or chassis of the vehicle is open and extended as shown in Fig. 2 is perpendicularly supported in the grooved brackets 5³, these brackets being formed by attaching appropriate strips to each of the sides 1 of the body; the seat proper 5¹, is permanently secured to the brackets 5² while the movable member 5 of the seat, forms when in the position shown in Fig. 2, the back of the seat, and when adjusted to the position shown in Fig. 14 forms a closing lid for the front end of the case.

It will be seen from the foregoing description that the various parts of the complete vehicle shown in Fig. 2 can be readily adjusted and manipulated so that all detachable parts of the vehicle can be conveniently packed within the body thereof and by means of the movable member 5 of the seat, the movable section 24 of the bottom and the hinged section 8, a complete packing case will be made, which as heretofore stated can be locked. For instance the brake rod 15 and its connections will be drawn up within the body and the movable section 24 of the bottom inserted in place and locked; the hood 43 will be unbottoned or unclasped from the skeleton frame 44 and packed within the body; the legs 45 of the skeleton frame 44 will be folded upwardly as shown in Fig. 11 and the frame packed in the body; the sectional telescopic steering rods will be disconnected from the front wheel hub, closed as shown in Fig. 12 and also packed in the body; the front wheels 7 will be disconnected from the axle, and the rear wheels 7 and short axles 7¹ will be disconnected from the sleeves 31 and all four wheels packed in the body. The tube 9 will then be telescoped into the tube 10 carrying the forward part of the chassis with it, and then by engaging and locking the member 5 of the seat and the hinged section 8, a complete case will be formed inclosing all parts of the vehicle.

If a vehicle of the construction I have described is to be operated or driven by a gas or other internal combustion engine, I propose to use the partitioned frame 51, (see Fig. 9) provided with flexible extensions 52 for the purpose of holding the gasolene tanks. When this partition 51 is used it will be inclosed by the skeleton frame 44, and the tanks placed in the partitioned frame 51 will be firmly held by means of the flexible extensions 52 so that these tanks will not be disturbed by the shocks and jars incident to the running of an automobile. When a steam engine is used as the driving power of the vehicle, the partitioned frame 51 will be dispensed with.

In Figs. 3 and 4 of the drawings I have shown a novel form of resilient spoke particularly adapted for a light vehicle of the construction I have described. I propose to form the spokes 28 of flat spring steel (see Fig. 4); having two tongues 30 struck up and bent oppositely to each other so that when the central portion 29 is bent to the elliptical form shown in Fig. 3, one tongue 30 will have a bearing on top of the flat section of the central portion 29 and the other tongue 30 will have a bearing in the opposite direction against the bottom thereof. The elliptical section 29 in combination with the tongues 30 will have the same effect as a spring and impart to the wheel great resiliency, absorbing all jars and concussions and precluding the same from being communicated to the vehicle body to any material extent.

In Fig. 8 of the drawing I have shown a cradle or holder for the engine employed to drive the vehicle. This cradle comprises a bed plate 46 having two upwardly extending and inwardly curved flanges 47 and two outwardly extending projections 47¹, by means of which the cradle may be rigidly but removably secured to the vehicle as by bolts; the engine casing with the engine mounted in it is to be slid into this cradle from the front end thereof and pushed into place until the rear end of the base plate of the casing bears against a shoulder formed at the rear end of the cradle, and then by means of the cam lock 49, the engine may be firmly locked in place on the cradle.

As shown in Figs. 17 and 18 the rear axle 16 is provided with the usual ball or roller bearings 33 which are confined in the sleeves 31; the latter is provided with a screw cap 32 by means of which the sleeve may be opened whenever it is necessary to clean or adjust the roller bearings.

In Figs. 19 and 20 I have shown a flexible, resilient hand grip for the steering head; this consists of the flat spokes 35, having secured at their outer ends the spirally shaped spring hand grip 34; as a convenient method of securing the spring 34 to the outer ends of the spokes 35 I bend the metal of the outer end of each spoke around the spiral spring 34 so as to form a tubular head 36, at the outer end of each spoke inclosing the spiral spring 34; the bent over end of each spoke is lapped back on the body thereof and secured to the latter as by rivets 37. By this construction I produce a flexible and resilient hand grip for the steering mechanism which will compensate for the usual jars and concussions which occur in running an automobile and will prevent the same from being imparted to the operator.

In Fig. 22 I have shown strengthening means for the fabric or material which may be used to make the body of the vehicle; this strengthening means consists of interlaced wires, or interlaced wire fabric 38, which is interposed or embedded in the fabric or material 39 of which the body is made whether the material employed is papier mâché, artificial leather, wood veneering or other material. I prefer to employ hollow wires as the strengthening medium.

I have now described the construction and arrangement of the devices embodying my invention so far as the same pertain to the vehicle body or chassis, running gear, etc., and it is obvious that one of the most important characteristics which mark this invention resides in the adjustment of the automobile body or chassis whereby a closing case can be formed which will inclose all the parts of the automobile so that this case can be handled with the same facility as a large trunk, and be readily stored, or conveyed from place to place as desired:—Hence it follows in order to obtain this desirable feature of advantage and novelty that the various parts of the vehicle I have described must combine lightness with strength and durability, and for the same reason it is essential that the engine employed should have similar qualifications and also be compact.

Any suitable motor or engine having these qualifications may be utilized in connection with appropriate mechanism whereby the power of the motor can be transmitted to propel or manipulate the vehicle, but as motors of this class and power transmission devices are well known it is unnecessary to particularly describe the same.

What I claim as my invention and desire to secure by Letters Patent, is:—

1. An automobile body or chassis which can be adjusted to form a closed case of rectangular or other desirable shape and constitute a trunk or inclosing case for all parts of the automobile, comprising an adjustable top section and end section, and longitudinally adjustable slides having the front end of the body secured thereto, whereby said slides may be extended to complete the chassis or retracted when the inclosing case is formed, substantially as described.

2. An automobile body or chassis which can be adjusted to form a closed case of rectangular or other desirable shape and constitute a trunk or inclosing case for all parts of the automobile, comprising an adjustable top section, bottom section and end section, and longitudinally adjustable slides having the front end of the body secured thereto, whereby said slides may be extended to complete the chassis or retracted when the inclosing case is formed, substantially as described.

3. A case of substantially rectangular shape and having telescoping extensible tubular frames mounted longitudinally in brackets on the interior of each side thereof, and having a platform mounted on the outer ends thereof, said case being provided with an adjustable top section and end section, whereby said case can be opened and the tubular frames extended to form the body or chassis of an automobile, or closed to constitute a trunk or inclosing case, substantially as described.

4. A case of substantially rectangular shape and having telescoping extensible tubular frames mounted longitudinally in brackets on the interior of each side thereof and having a platform mounted on the outer ends thereof, said case being provided with an adjustable top section, bottom section and end section, whereby said case can be opened and the tubular frames extended to form the body or chassis of an automobile, or closed to constitute a trunk or inclosing case, substantially as described.

5. The combination with the material of which the frame or body is composed of a strengthening medium comprising interlaced hollow wire or interlaced wire fabric interposed or embedded in said material, substantially as described.

6. The combination with an automobile body or chassis of substantially the construction described of the skeleton frame 44, having the foldable legs 45, for the purposes set forth.

7. The combination with an automobile body or chassis of substantially the construction described of the detachable wheels 7, and means for securing the same in place to form the running gear of the vehicle, substantially as described.

8. The combination with the skeleton frame 44, of the removable hood 43, substantially as described for the purposes stated.

Signed at New York city in the county of New York and State of New York this 27th day of April A. D. 1906.

EDWIN C. BRUEN.

Witnesses:
ERNEST C. WEBB,
WM. C. LAMBRECHT.